US006288359B1

United States Patent
Koch et al.

(10) Patent No.: US 6,288,359 B1
(45) Date of Patent: Sep. 11, 2001

(54) WELDING DEVICE FOR TWO WORK PIECES TO BE JOINED TOGETHER BY A WELD SEAM WHICH IS CLOSED IN ITSELF

(75) Inventors: Martin Koch, Neukirchen-Vluyn; Thomas Stegemann-Auhage, Dinslaken; Hermann Bies, Duisburg, all of (DE)

(73) Assignee: Thyssen Krupp Stahl AG, Dusseldorf (DE)

( * ) Notice: Subject to any disclaimer, the term of this patent is extended or adjusted under 35 U.S.C. 154(b) by 0 days.

(21) Appl. No.: 09/529,314

(22) PCT Filed: Oct. 5, 1998

(86) PCT No.: PCT/EP98/06336

§ 371 Date: Apr. 11, 2000

§ 102(e) Date: Apr. 11, 2000

(87) PCT Pub. No.: WO99/20430

PCT Pub. Date: Apr. 29, 1999

(30) Foreign Application Priority Data

Oct. 17, 1997 (DE) .............................. 197 45 929

(51) Int. Cl.⁷ .................................................. B23K 26/00
(52) U.S. Cl. ................................ 219/121.63; 219/121.79; 219/121.82
(58) Field of Search .................. 219/121.63, 121.64, 219/121.67, 121.78, 121.79, 121.82; 228/45

(56) References Cited

U.S. PATENT DOCUMENTS 5,961,858 * 10/1999 Britnell ........................... 219/121.63
6,065,668 * 5/2000 Natali ................................. 228/204

FOREIGN PATENT DOCUMENTS 40 04 544 * 8/1991 (DE) ................................ 219/121.63
44 10 039 * 9/1995 (DE) ................................ 219/121.63

OTHER PUBLICATIONS

Dr. Lothar Morgenthal et al, "Intelligente Nahtsensorik fur das Laserschweissen", Tagungsband der 4. Konferenz fur Strahltechnik, pp. 196–199, XP–002092623, May 8–9, 1996.*

Drews P. et al., "Sensorsystem zur Hochgenauen Erfassung von Schweissfugen Beim Laserstrahlschweissen", Schweissen und Schneiden, vol. 47, No. 11, Nov. 1, 1995, p 924, 926/927.*

* cited by examiner

Primary Examiner—Samuel M. Heinrich
(74) Attorney, Agent, or Firm—Proskauer Rose LLP

(57) ABSTRACT

The invention relates to a welding device operating by laser for two workpieces (1, 2) to be connected to one another via a self-contained, continuously extending weld seam (N). The welding device comprises a focusing optical system (7) having a seam follow-up sensor (10) and is borne by a pivoting arm (11), so that the focussing optical system (7) describes a circular path in relation to the workpieces (1, 2). The positioning of the focusing optical system (7) on the pivoting arm (11) is corrected by means of a drive (13) in dependence on the measuring result of the seam follow-up sensor (10).

8 Claims, 2 Drawing Sheets

Figure 1:
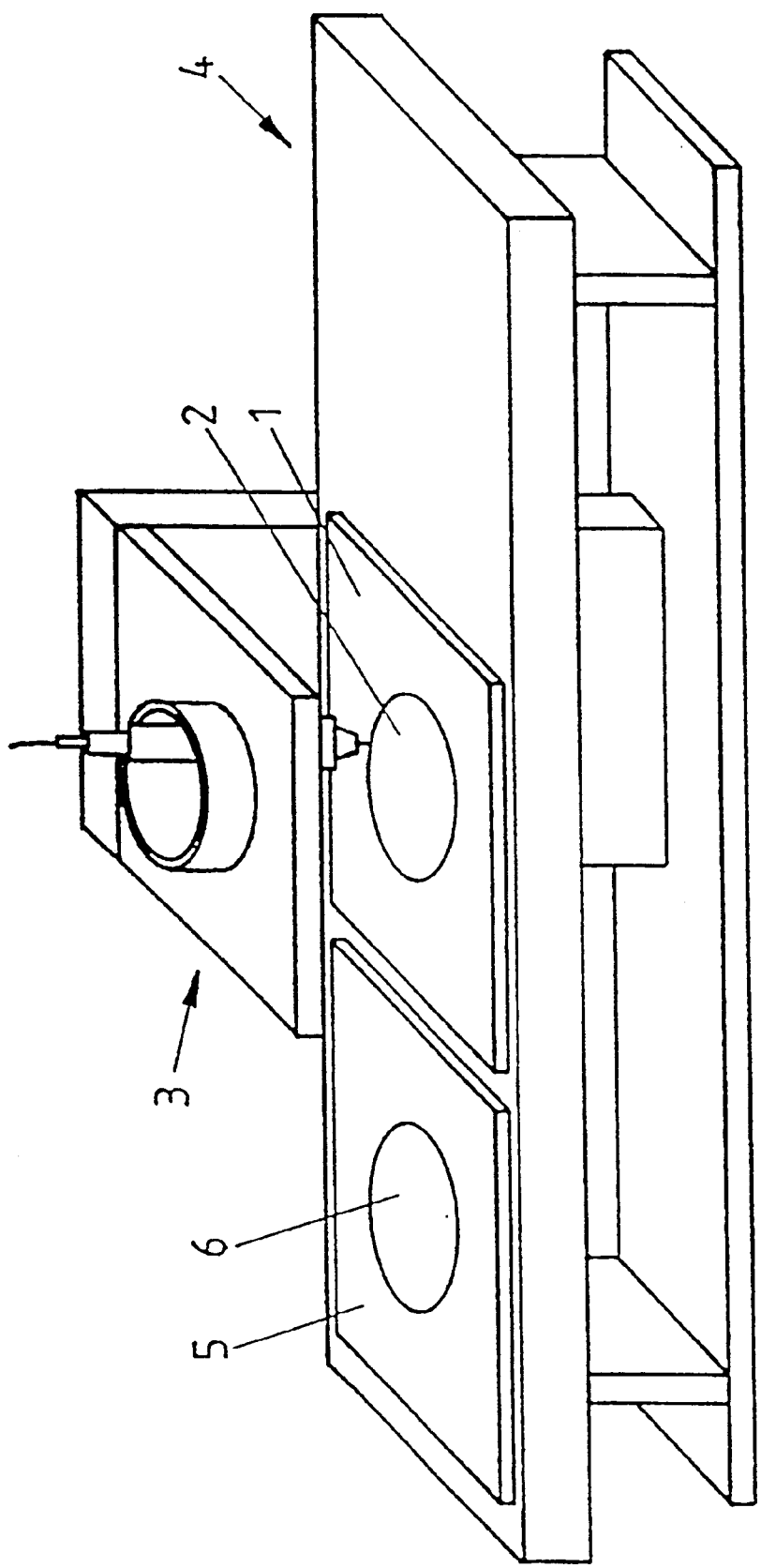

WELDING DEVICE FOR TWO WORK PIECES TO BE JOINED TOGETHER BY A WELD SEAM WHICH IS CLOSED IN ITSELF

The invention relates to a welding device for two workpieces to be connected to one another via a self-contained, continuously extending weld seam, having: a workpiece receptacle; a laser beam source connected to a focusing optical system; and a pivoting arm which is disposed above the workpieces and bears the focusing optical system and which rotates around its pivoting axis lying perpendicular to the welding plane and inside the self-contained weld seam, the position of the focusing optical system on the pivoting arm acting as a guide being changeable by means of a drive.

Welding devices of the kind specified, with and without leading seam follow-up sensors, are known.

DE-OS 44 10 039 discloses a device of the kind specified for the processing of workpieces, wherein the laser head emitting the laser radiation is attached to a guide plate. In accordance with the welding movement to be performed the guide plate is guided by means of a pivoting arm over a closed circular path around a central axis of rotation above the workpiece. The distance between the circular path and the axis of rotation depends on the inclined position of a rotary-movement-transmitting member of the pivoting arm in relation to the central plane of rotation. Due to this construction the device is of great height and the large number of bearings of the pivoting arm and its guide makes the construction very expensive, if the laser head is to be guided with reliable accuracy.

In a known laser welding device (DE 40 04 544 A1) without seam follow-up sensor the focusing optical system of the laser beam source is disposed fixed and the workpieces to be connected to one another along a circular seam are rotated with the workpiece receptacle in relation to the focusing optical system. Very expensive mechanical technology is required to retain the two workpieces in the required position in relation to one another during the rotary movement. The consequent heavy weight of the workpiece receptacle, to which the weight of the workpieces must be added, means that a correspondingly large size bearing system and a correspondingly large size drive are needed. When it is remembered that very narrow joint gaps are desirable and that the focus diameter of the laser beam is very small (e.g., 0.2 mm), considerable expenditure is also involved in the adjustment of the moveable workpiece receptacle in relation to the fixed laser optical system. However, even with very expensive technical equipment and very expensive adjustment it is difficult to obtain optimum welding results.

In another prior art welding device (EP 0 088 501 A1) without seam follow-up sensor for the welding of a circular seam on tubes the tube is fixed, while the focusing optical system of the laser beam source travels around the tube. To this end the focusing optical system is guided on a circular rail which concentrically encloses the tube. A precondition for a satisfactory weld seam is that the tube and the guide rail must be precisely aligned with one another. It is impossible to make a correction if the seam deviates from the required course. There is also the fact that the $CO_2$ laser beam source necessitates an expensive optical system with mirrors for guiding the laser beam from the irradiation source to the focusing optical system, which describes a circular path.

Another prior art welding device (JP 09150283 A), which is in principle constructed identically with the last-mentioned welding device, used as a YAG laser beam source instead of a $CO_2$ laser beam source. The result is a simplified guiding of the laser beam via an optical rotary lead-in. Otherwise, however, this device has the same disadvantages as the welding device last described.

Lastly, laser welding devices are known for the welding of, for example, longitudinal seams on tubes (Paper "Sensor System for the High Accuracy Determination of Welding Joints in Laser Beam Welding" in the Journal "Schweißen und Schneiden" (=Welding and Cutting) 47 (1995), Vol. 11, pages 924–927; Paper "Intelligent Seam Sensor System for Laser Welding", Proceedings of the 4th Conference for Radiation Technology, Halle (Saale); May 8 and 9, 1996, pages 196–199, organised by: DVS Deutscher Verband für Schweißtechnik e.V., Welding Technology Teaching and Testing Institute, Halle) in which a leading seam follow-up sensor is associated in a fixed geometrical relation with the focusing optical system, which is disposed at least substantially fixed and can be adjusted for corrections only by an adjusting member, for example, a pivoting arm. The workpiece to be welded is advanced in relation to the optical system in the direction of the weld seam. If the seam follow-up sensor detects that the weld joint is not situated in the optimum position in relation to the laser beam, the position of the focusing optical system can be corrected by means of a controlled drive engaging with the pivoting arm. This manner of adjusting the focusing optical system calls for no very expensive apparatus. In contrast, it is substantially more expensive if the measured value of the seam follow-up sensor adjusts the relative position of the laser beam and the workpiece by means of a CNC installation.

It is an object of the invention to provide a welding device by means of which self-contained weld seams, more particularly circular weld seams can be produced fault-free on workpieces at a low cost in apparatus and a low cost in set-up times.

This problem is solved according to the invention in a welding device of the kind specified by the feature that the positioning of the focusing optical system on the pivoting arm, retained after the fashion of a spoke in a rotatably mounted ring, is corrected in dependence on the measuring result of a seam follow-up sensor disposed in a fixed geometrical relation to the focusing optical system.

The welding device according to the invention has a simple mechanical structure. Since the pivoting arm lies with its pivoting axis in the centre of the self-contained weld seam, in the centre of the circle in the case of a circular seam, the circular path to which the focusing optical system on the pivoting arm is adjusted is in registration with the circular weld seam. Slight deviations in the registration of the two circles are evened out by the correction of the position of the focusing optical system on the pivoting arm. This applies in any case—i.e., both if the weld seam is not completely circular and also with an eccentric arrangement of weld seam and path of rotation of the focusing optical system due to a not completely accurate alignment of the workpieces with the pivoting axis of the pivoting arm. Basically the invention also enables non-circular weld seams to be welded, on condition that they can be followed by the seam follow-up sensor during the rotation of the pivoting arm and that the focusing optical system has an adequate adjusting range on the pivoting arm.

Due to the flat construction of the spoke and the ring, the overall height of the welding device can be small. An accurate positioning of the focusing optical system can be simply adjusted by the rotary movement of the ring and a translation movement on the spoke.

It is true that the device can be equipped with different laser beam sources (e.g., $CO_2$ or YAG lasers), but to simplify the guiding of the laser beam as far as possible, according to one feature of the invention the laser irradiation source is a YAG laser irradiation source and the focusing optical system is connected to the YAG laser irradiation source via an optical rotary lead-in. Transmission is via glass fibre cable. The rotary lead-in prevents the glass fibre cable from becoming twisted during the rotary movement of the focusing optical system.

According to one feature of the invention the ring takes the form of a hollow cylinder. With such a hollow cylinder a simple external bearing can be provided. This applies also to the drive. The drive used can be a cogwheel or toothed belt drive.

The arrangement of the focusing optical system on the pivoting arm acting as a guide also creates a precondition for a simply designed drive. The drive for the focusing optical system and the seam follow-up sensor can therefore take the form of a spindle, cogwheel or traction cable drive. A suitable seam follow-up sensor has been found to be a sensor operating on the triangulation principle.

To enable the operating time of the welding device to be fully utilised, according to the invention the workpiece receptacle is provided with at least one further workpiece receptacle in a changeover table or a rotary table. While with a welding device so constructed a weld seam is being adjusted on one pair of workpieces, the other pair of workpieces can already be moved into the position in relation to one another for welding, thus making very short the changeover time from one pair of workpieces to the next pair, during which the welding device cannot operate.

Figure 2:
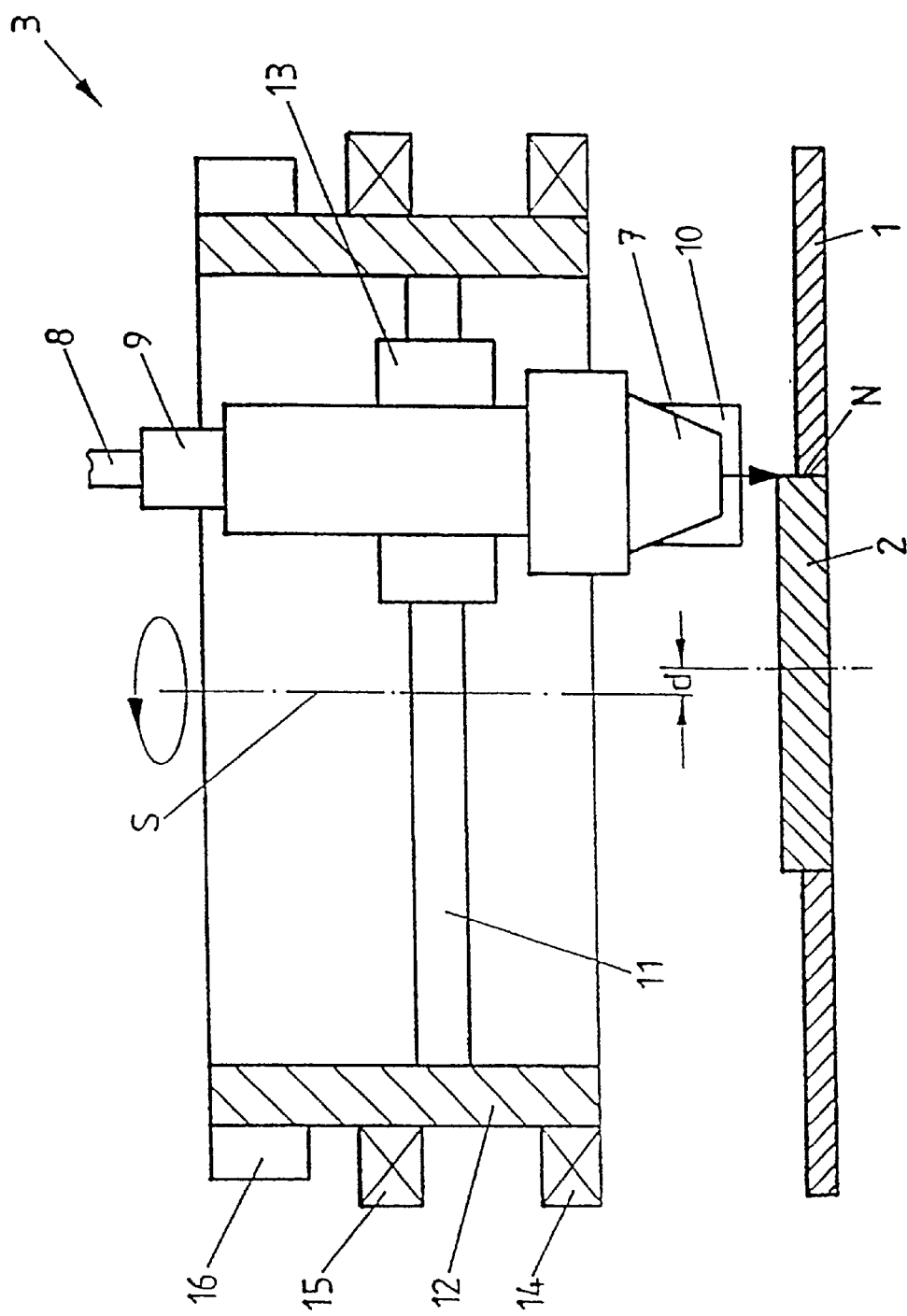

An embodiment of the invention will now be explained in greater detail with reference to the drawings, which show:

FIG. 1 an isometric presentation of a welding device with workpiece receptacle and focusing optical system, and FIG. 2 a diagrammatic vertical section through the welding device shown in FIG. 1, with the focusing optical system above two workpieces to be welded to one another.

Referring to FIG. 1, two workpieces, namely a flat sheet metal plate 1 formed with a circular recess and a round 2 inserted therein with a smaller gap as possible are situated in a welding position below a welding device 3. While the plate 1 consists of a thin sheet of, for example, 1.5 mm, the round 2 consists of a substantially thicker sheet of, for example, 2.5 mm. This differential sheet thickness allows for the subsequent locally differential loading of the structural member 1, 2 for as low a total weight as possible. The structural member 1, 2 welded together from the plate 1 and the round 2 is intended, for example, for the production of shock-absorber leg receptacles (domes) on motor vehicles. For this purpose it is also shaped by pressing or deep drawing.

The plate 1 and the round 2 are preferably clamped in the workpiece receptacle from below, for example, by magnetic or pneumatic clamping means.

In the embodiment illustrated in FIG. 1 the structural member 1, 2 is retained by a workpiece receptacle 4 taking the form of a changeover table. The special feature of such a changeover table is that one structural member 1, 2 is situated in the welding position, while a similar structural member consisting of plate 5 and round 6 is disposed alongside the welding position in a standby position, in which it is assembled and aligned. When the first structural member 1, 2 has been welded together, the second structural member 5, 6 is moved into the welding position. To enable it to be aligned in the welding position in relation to the welding device 3, simple guides and stops are provided, which are not shown in the drawings.

The welding device 3, shown in detail in FIG. 2, has a laser irradiation source, namely a YAG laser irradiation source (not shown) and a focusing optical system 7. The focusing optical system 7 is connected to the YAG laser irradiation source via an optical fibre cable 8 and an optical rotary lead-in 9. The focusing optical system 7 and a seam follow-up sensor 10 associated therewith in a fixed geometrical relation are borne by a pivoting arm 11 which acts as a guide and is constructed after the fashion of a spoke in a ring 12 taking the form of a hollow cylinder. The focusing optical system 7 and the seam follow-up sensor 10 are guided in the radial direction on the pivoting arm 11 and can be adjusted by a drive 13. Adjustment is in accordance with a measuring signal delivered from the seam follow-up sensor to a control unit (not shown). The hollow cylinder 12 is mounted externally via bearings 14, 15 and driven from outside, for example, by means of a toothed belt which engages in a gear wheel 16.

The centre of the round 2 of the structural member 1, 2 situated in the welding position should be aligned with the pivoting/rotational axis S of the pivoting arm/focusing optical system 7. A slight eccentricity d is non-critical on condition that it can be compensated by the adjustment of the focusing optical system 7 on the pivoting arm 11. To make this possible, in the first place the seam follow-up sensor 10 must be able to detect the deviation. As a rule use is made of a sensor (e.g., a light section sensor) operating on the triangulation principle—i.e., a sensor having a measuring line extending transversely of the weld seam N.

The particular advantages of the invention is that the same welding device 3 can be used to cover a large diameter range of self-contained weld seams N, since the focusing optical system 7 can be moved over the entire diameter. There is no need for a very accurate alignment of workpieces 1, 2 and focusing optical system 7, since the position of the focusing optical system 7 can be simply corrected on the pivoting arm 11 acting as a guide. No additional vertical adjustment is required, since with underside clamping the workpieces 1,2 can be changed without colliding with the focusing optical system 7 and the seam follow-up centre 10.

The rotation of the focusing optical system 7 through more than 360° in relation to the laser irradiation source, allowing for a sensor leading distance and an overwelding zone, is non-critical, since with the use of YAG laser irradiation sources the optical rotary lead-in 9 can be used.

What is claimed is:

1. A welding device for two workpieces (1, 2) to be connected to one another via a self-contained, continuously extending weld seam (N), having: a workpiece receptacle (4); a laser beam source connected to a focusing optical system (7); and a pivoting arm (11) which is disposed above the workpieces (1, 2) and bears the focusing, optical system (7) and which rotates around its pivoting axis (S) lying perpendicular to the welding plane and inside the self-contained weld seam (N), the position of the focusing optical system (7) on the pivoting arm (11) acting as a guide being changeable by means of a drive (13), characterized in that the positioning of the focusing optical system (7) on the pivoting arm (11), retained after the fashion of a spoke in a rotatably mounted ring (12), is corrected in dependence on the measuring result of a seam follow-up sensor (10) disposed in a fixed geometrical relation to the focusing optical system (7).

2. A welding device according to claim 1, characterised in that the laser irradiation source is a YAG laser irradiation source and the focusing optical system (7) is connected to the YAG laser irradiation source via an optical rotary lead-in (9).

3. A welding device according to claim 1, characterised in that the ring (12) takes the form of a hollow cylinder.

4. A welding device according to claim 3, characterised in that the hollow cylinder (12) is mounted externally and driven from outside.

5. A welding device according to claim 1, characterised in that the drive (13) of the focusing optical system (7) and the seam follow-up sensor (10) takes the form of a spindle, cogwheel or traction cable drive.

6. A welding device according to claim 1, characterised in that the seam follow-up sensor (10) operates by the triangulation principle.

7. A welding device according claim 1, characterised in that the workpiece receptacle (4) is provided with at least one further workpiece receptacle in a changeover table or a rotary table.

8. A welding device according to claim 1, characterised in that the workpiece receptacle (4) has magnetic or pneumatic or hydraulic clamping means engaging from below.

* * * * *